(12) United States Patent
Adachi et al.

(10) Patent No.: US 11,215,887 B2
(45) Date of Patent: Jan. 4, 2022

(54) DISPLAY DEVICE

(71) Applicant: Japan Display Inc., Tokyo (JP)

(72) Inventors: Koichiro Adachi, Tokyo (JP); Kenji Tanase, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/796,499

(22) Filed: Feb. 20, 2020

(65) Prior Publication Data

US 2020/0272002 A1    Aug. 27, 2020

(30) Foreign Application Priority Data

Feb. 27, 2019   (JP) .............................. JP2019-034659

(51) Int. Cl.
*G02F 1/1339* (2006.01)
*G02F 1/1368* (2006.01)
*G02F 1/1362* (2006.01)

(52) U.S. Cl.
CPC ...... *G02F 1/136209* (2013.01); *G02F 1/1339* (2013.01); *G02F 1/1368* (2013.01); *G02F 1/136286* (2013.01); *G02F 2201/121* (2013.01); *G02F 2201/123* (2013.01)

(58) Field of Classification Search
CPC .............. G09G 3/36; G09G 2300/023; G09G 2300/026; H01L 23/3142; H01L 27/3293; H01L 27/3267; G06F 1/1616; G02F 1/1339; G02F 1/136209; G02F 1/133377
See application file for complete search history.

(56) References Cited

U.S. PATENT DOCUMENTS

| | | | | |
|---|---|---|---|---|
| 2004/0129207 A1* | 7/2004 | Jung | ..................... | G02F 1/1339 118/300 |
| 2014/0198290 A1* | 7/2014 | Lim | ................... | G02F 1/133377 349/143 |
| 2015/0364396 A1* | 12/2015 | Asai | ..................... | G02F 1/13336 257/43 |
| 2016/0004108 A1* | 1/2016 | Bae | ................... | G02F 1/133377 349/122 |
| 2017/0038629 A1* | 2/2017 | Joo | ..................... | G02F 1/13394 |
| 2019/0146261 A1* | 5/2019 | Im | ....................... | H01L 51/0096 349/106 |

FOREIGN PATENT DOCUMENTS

JP          6080316 B2     2/2017

* cited by examiner

*Primary Examiner* — Mariam Qureshi
(74) *Attorney, Agent, or Firm* — K&L Gates LLP

(57) ABSTRACT

According to one embodiment, a display device includes a first display portion including a first pixel, a second display portion including a second pixel, a first light shield surrounding the first display portion and the second display portion, a second light shield disposed between the first display portion and the second display portion, a liquid crystal layer disposed in the first display portion and the second display portion, a first sealant overlapping the first light shield and sealing the liquid crystal layer in the first display portion and the second display portion, and a second sealant overlapping the second light shield. The second sealant has at least one opening through which the first display portion and the second display portion communicate.

17 Claims, 13 Drawing Sheets

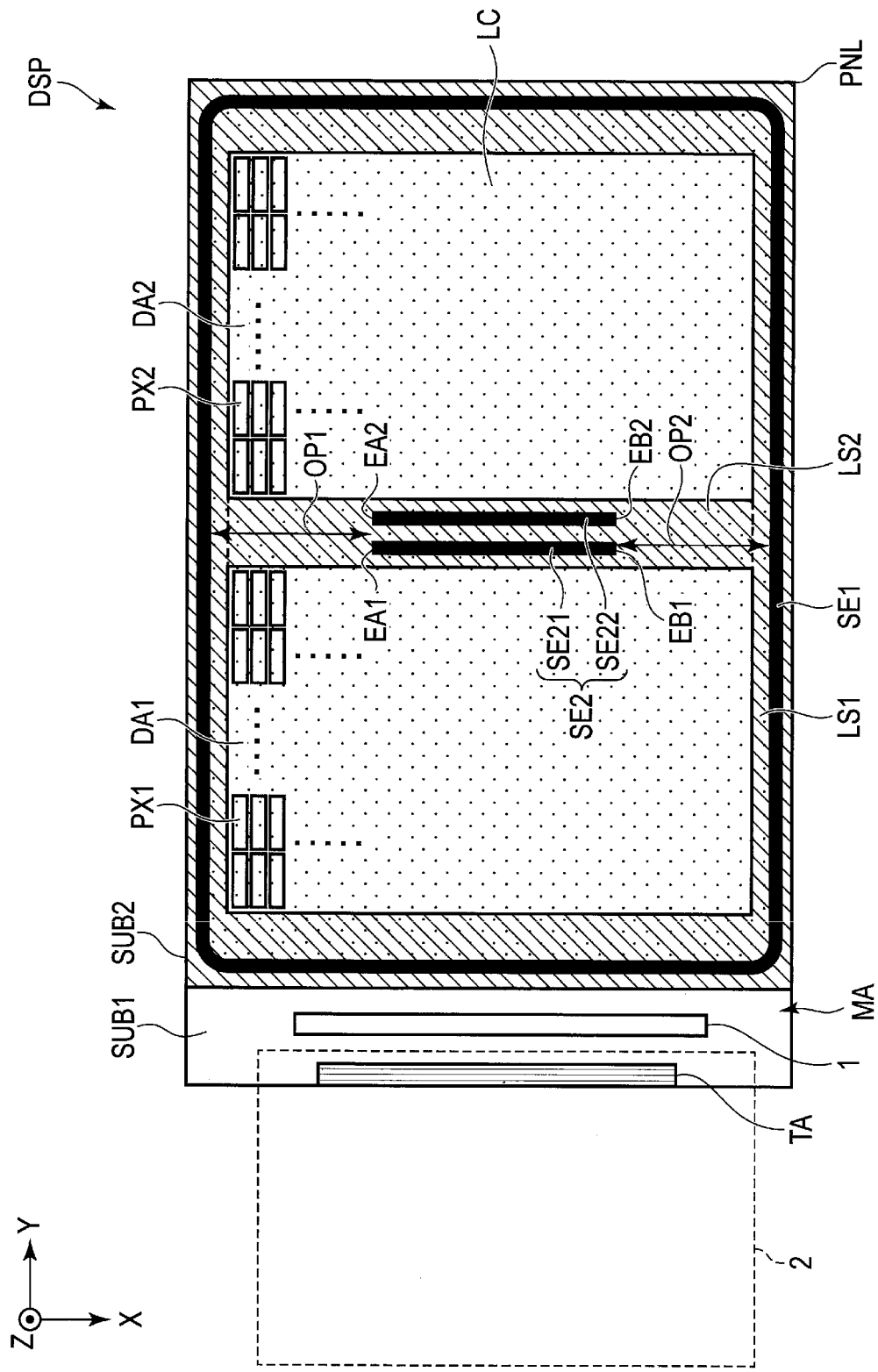
F I G. 1

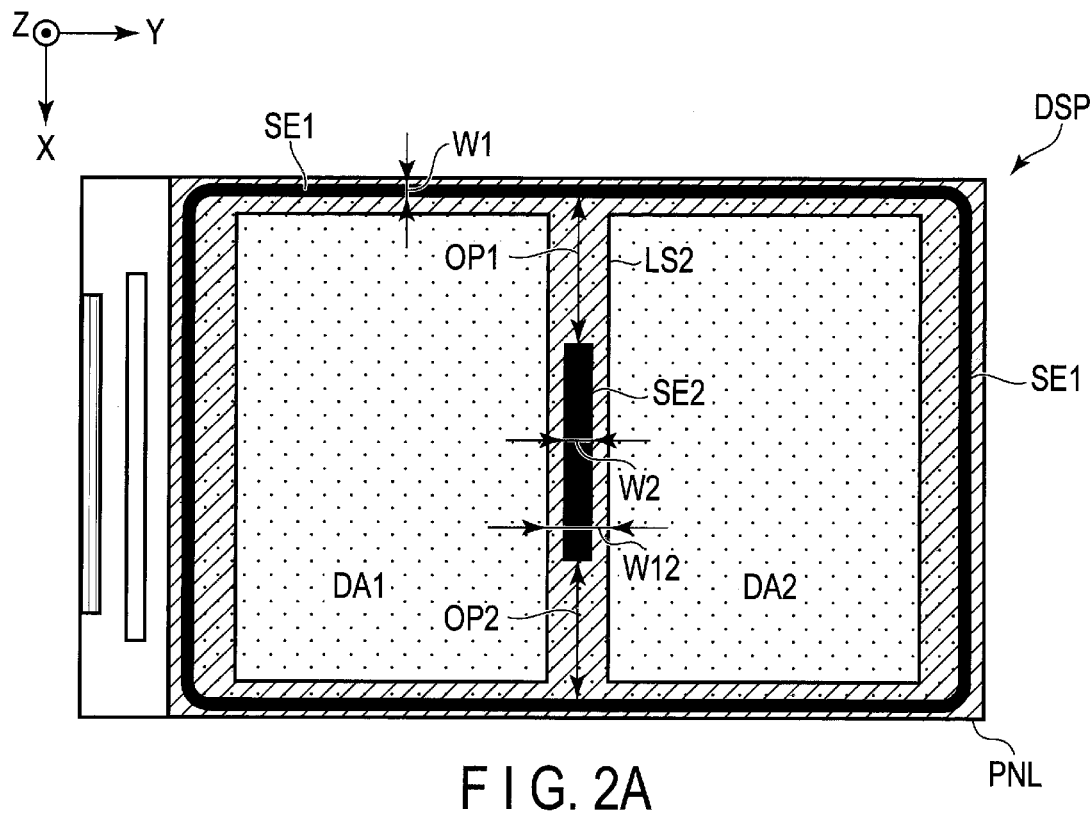
F I G. 2A
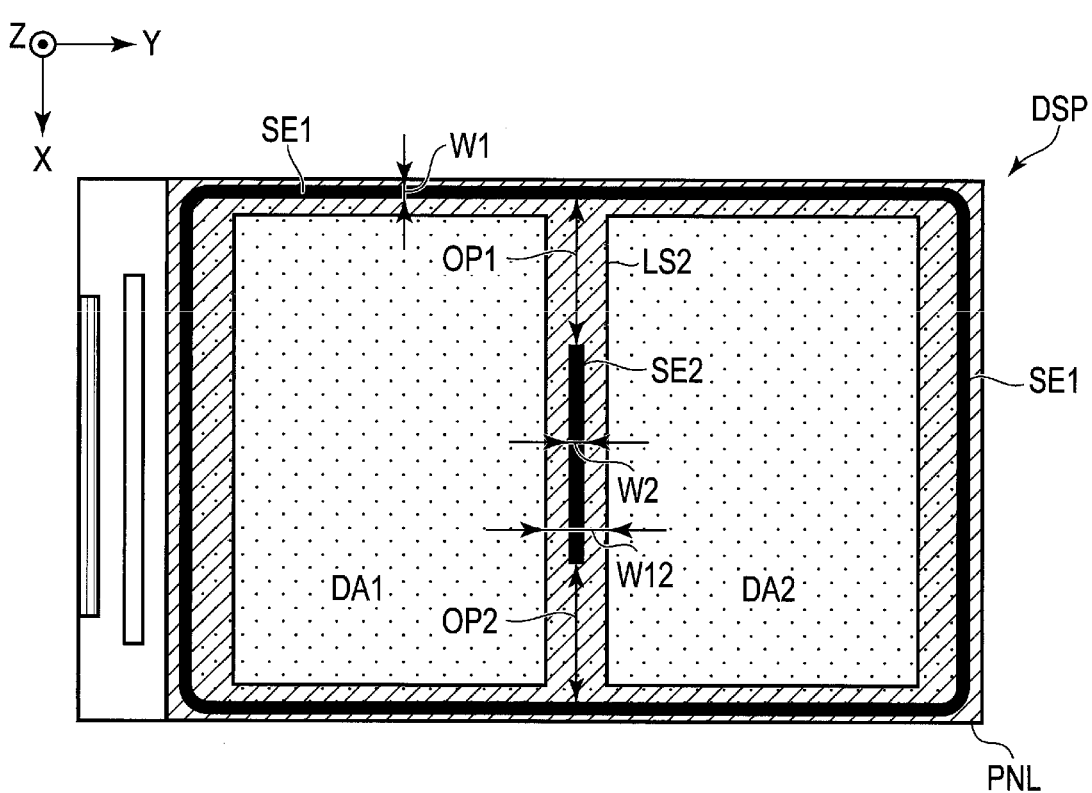
F I G. 2B

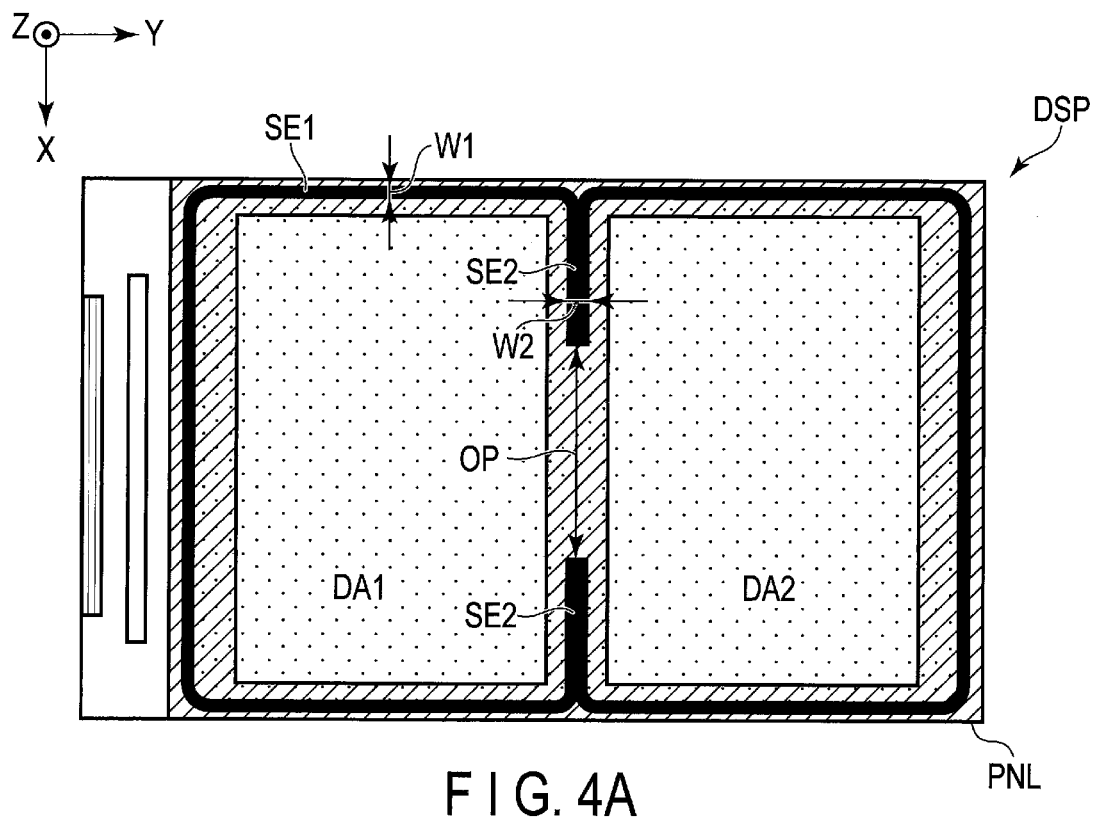
F I G. 4A
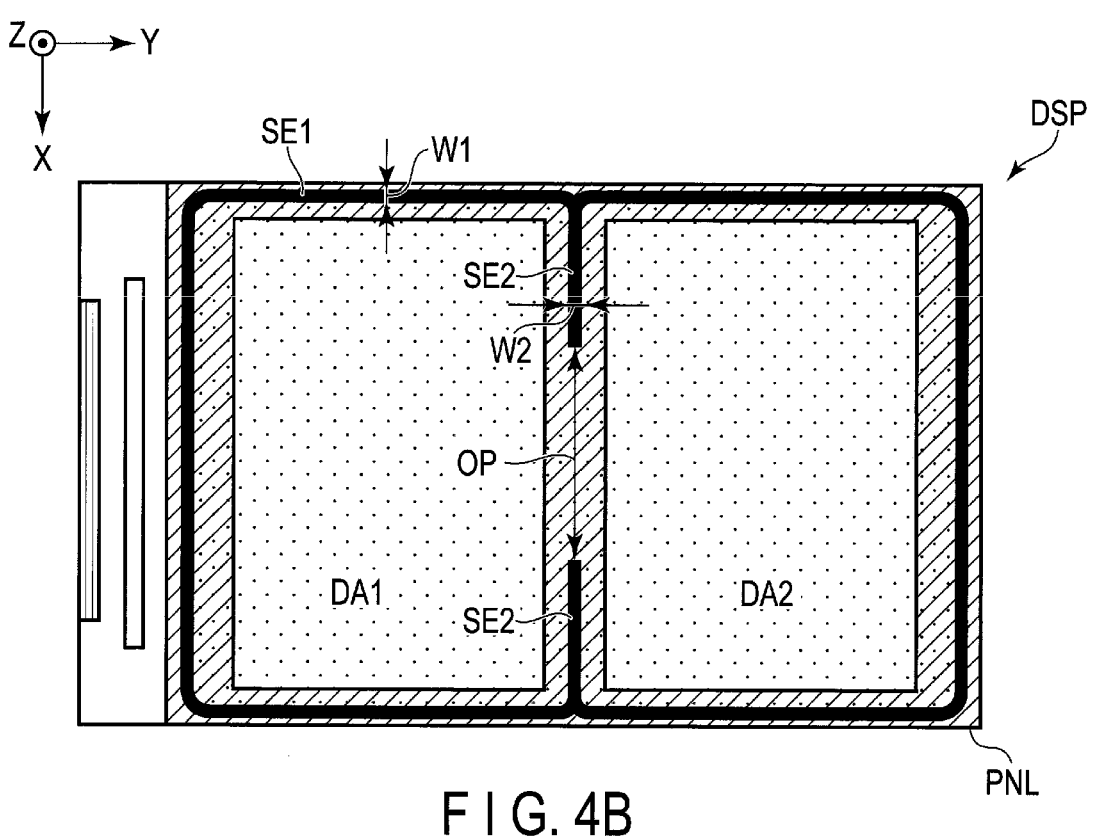
F I G. 4B

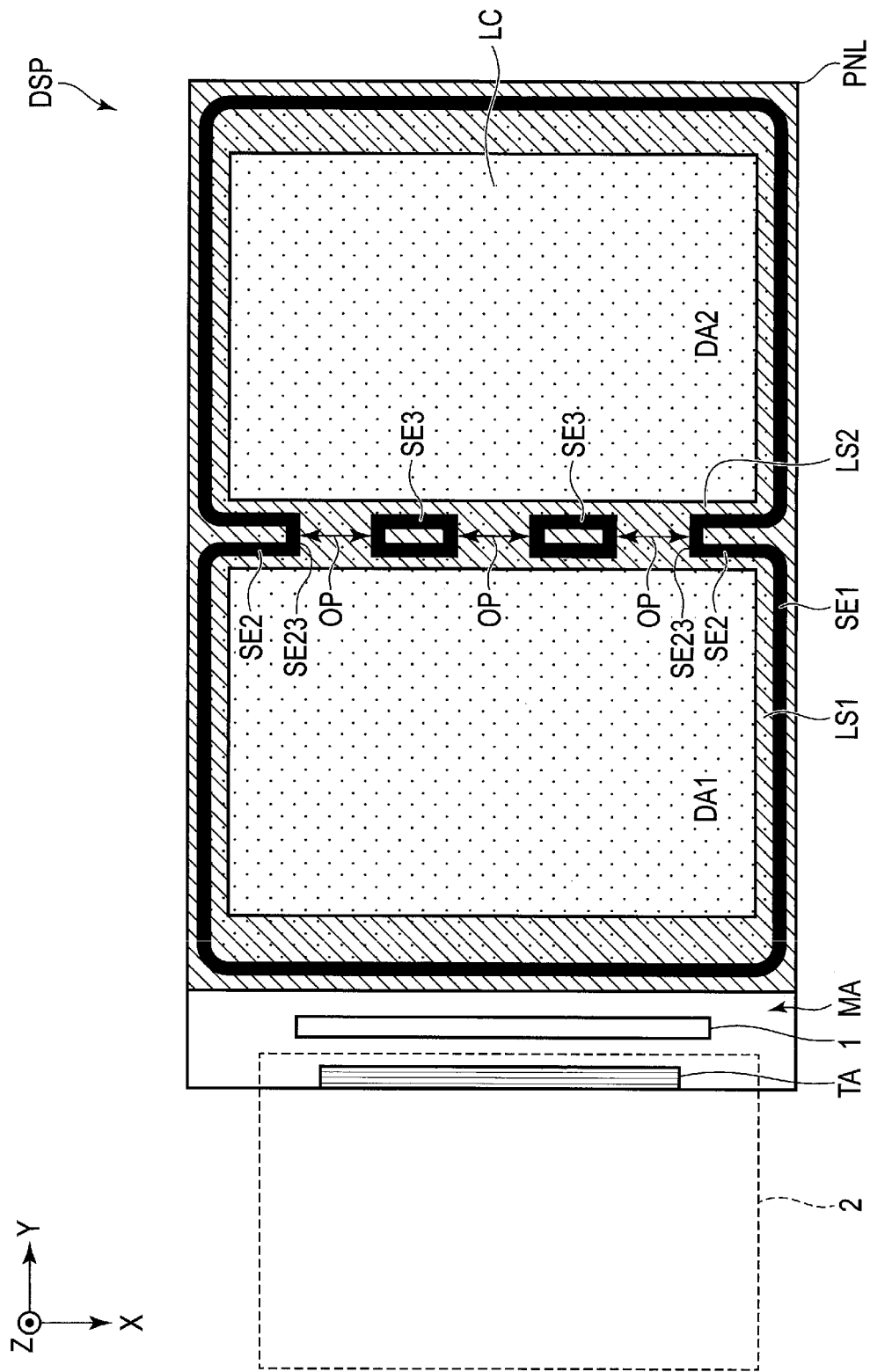
F I G. 5

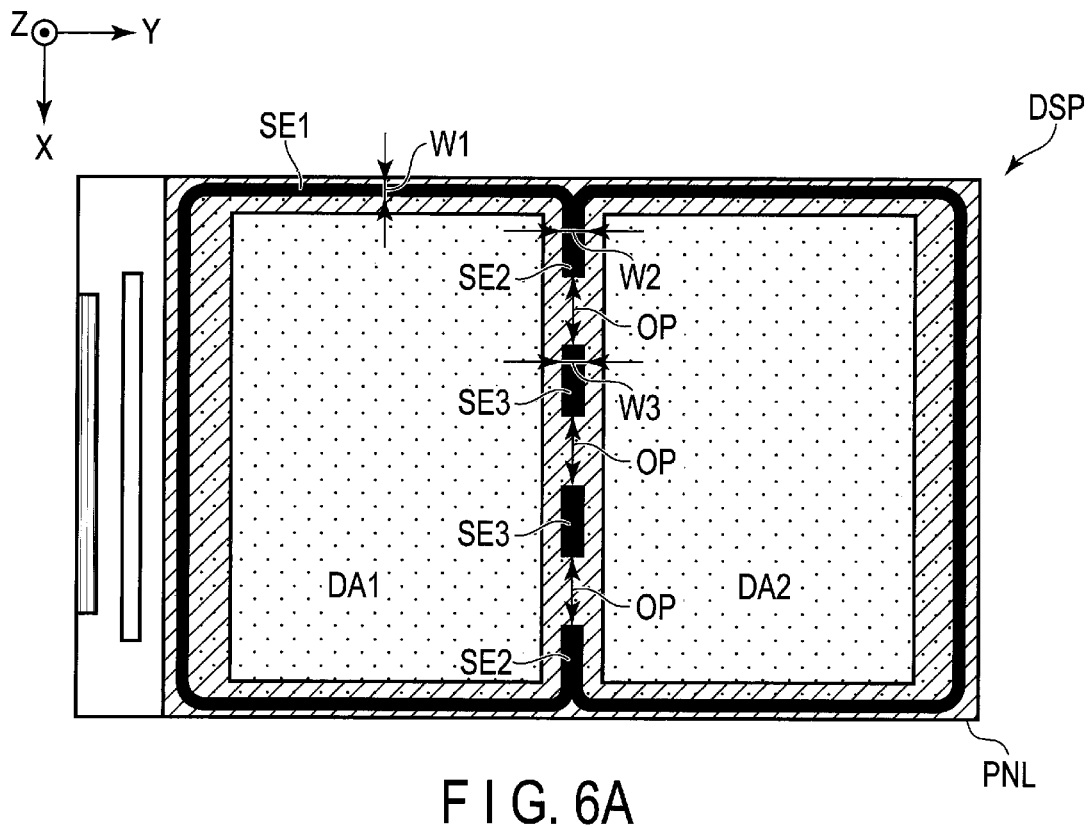
F I G. 6A
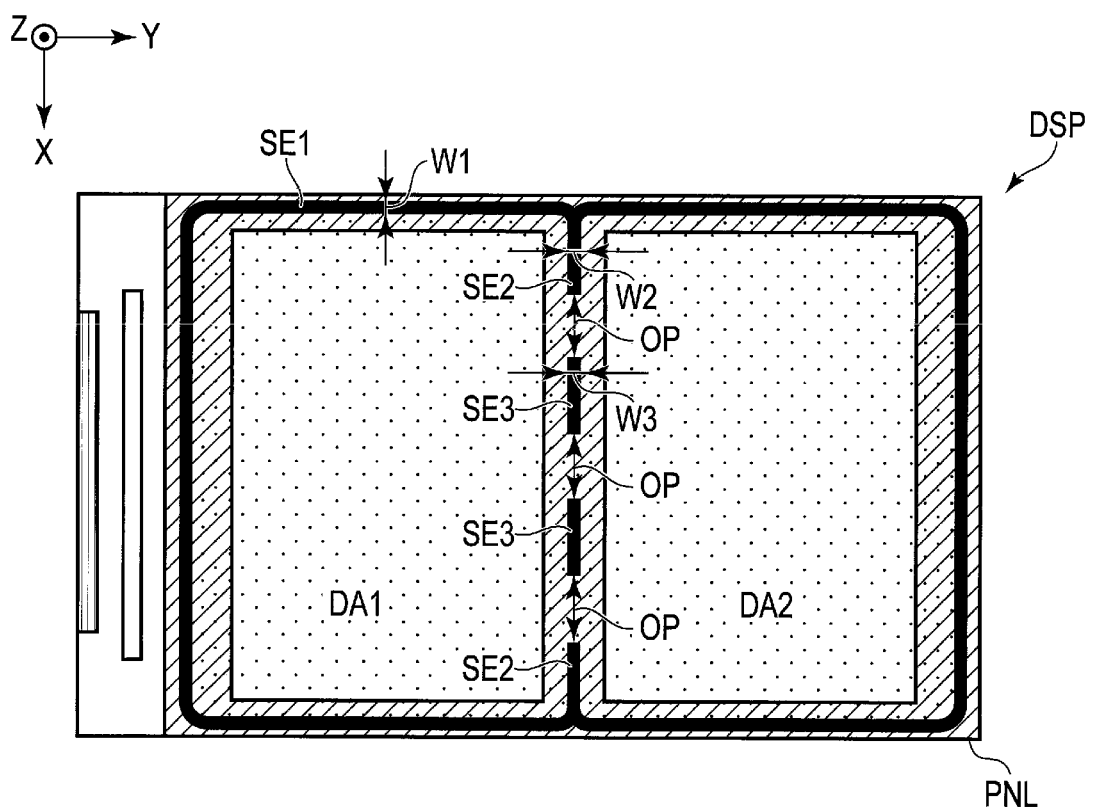
F I G. 6B

DISPLAY DEVICE

CROSS-REFERENCE TO RELATED APPLICATIONS

This application is based upon and claims the benefit of priority from Japanese Patent Application No. 2019-034659, filed Feb. 27, 2019, the entire contents of which are incorporated herein by reference.

FIELD

Embodiments described herein relate generally to a display device.

BACKGROUND

Recently, a display device including a plurality of display portions on the same substrate has been proposed. In such a display device, it is necessary to prevent a difference of display quality between the display portions.

In a liquid crystal display device, a liquid crystal layer is held at a predetermined cell gap. Changing the cell gap due to a warp of a substrate may cause an uneven display. Furthermore, a high-definition liquid crystal display device tends to slide its pixel electrodes and color filter easily due to pressure with a light load, this may lead to a color sift different from a desired color.

SUMMARY

The present application generally relates to a display device.

According to one embodiment, a display device includes a first display portion including a first pixel, a second display portion including a second pixel, a first light shield surrounding the first display portion and the second display portion, a second light shield disposed between the first display portion and the second display portion, a liquid crystal layer disposed in the first display portion and the second display portion, a first sealant overlapping the first light shield and sealing the liquid crystal layer in the first display portion and the second display portion, and a second sealant overlapping the second light shield. The second sealant has at least one opening through which the first display portion and the second display portion communicate.

BRIEF DESCRIPTION OF THE DRAWINGS

FIG. 1 is a plan view showing a configuration example of a display device DSP of the present embodiment.

FIG. 2A is a plan view showing other configuration examples of the display device DSP.

FIG. 2B is a plan view showing other configuration examples of the display device DSP.

FIG. 4A is a plan view showing other configuration examples of the display device DSP.

FIG. 4B is a plan view showing other configuration examples of the display device DSP.

FIG. 5 is a plan view showing another configuration example of the display device DSP.

FIG. 6A is a plan view showing other configuration examples of the display device DSP.

FIG. 6B is a plan view showing other configuration examples of the display device DSP.

DETAILED DESCRIPTION

Figure 3:
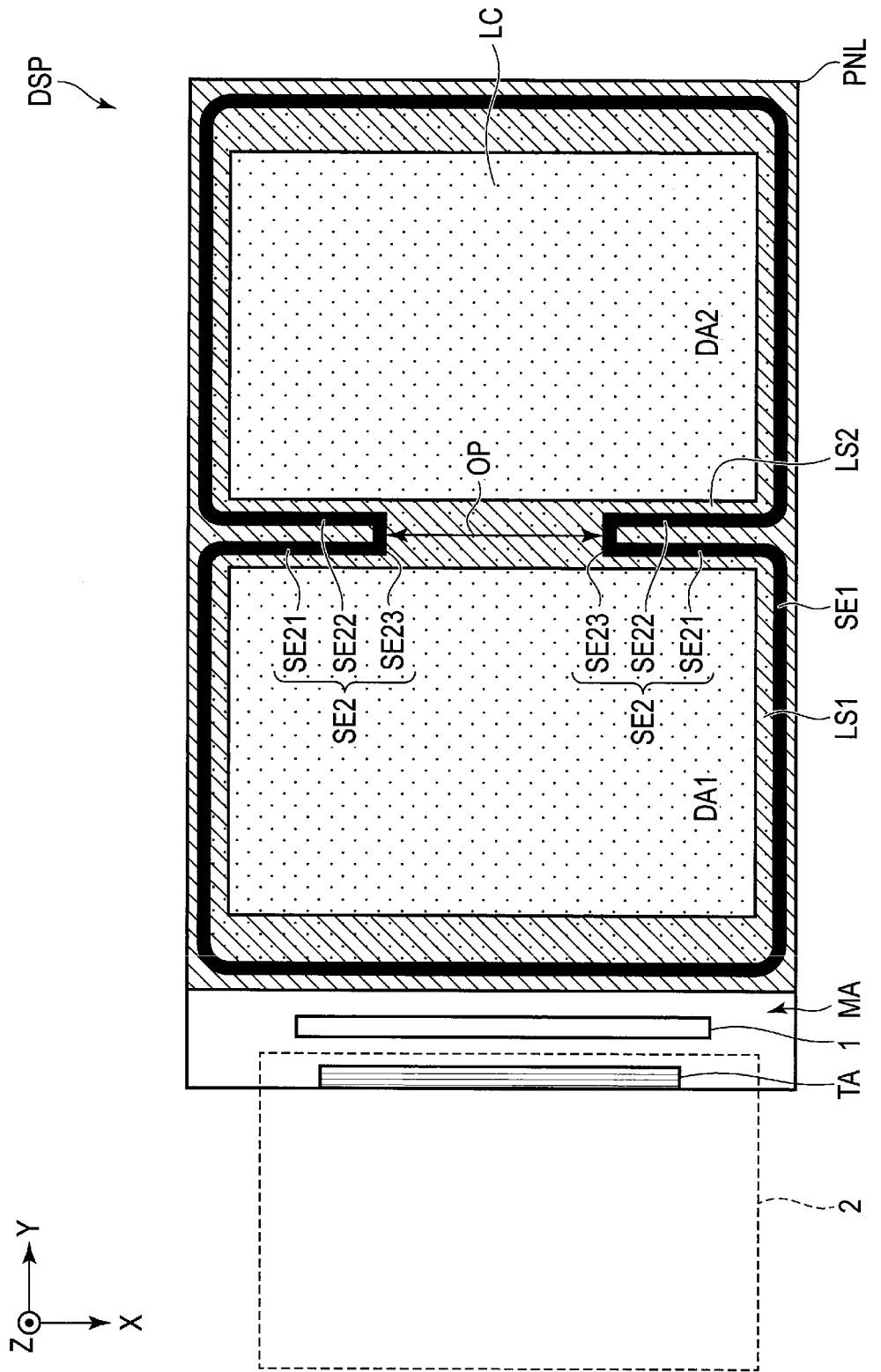
FIG. 3 is a plan view showing another configuration example of the display device DSP.

In general, according to one embodiment, a display device includes a first display portion including a first pixel, a second display portion including a second pixel, a first light shield surrounding the first display portion and the second display portion, a second light shield disposed between the first display portion and the second display portion, a liquid crystal layer disposed in the first display portion and the second display portion, a first sealant overlapping the first light shield and sealing the liquid crystal layer in the first display portion and the second display portion, and a second sealant overlapping the second light shield. The second sealant has at least one opening through which the first display portion and the second display portion communicate.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented, but such schematic illustration is merely exemplary, and in no way restricts the interpretation of the invention. In addition, in the specification and drawings, structural elements which function in the same or a similar manner to those described in connection with preceding drawings are denoted by the same reference numbers, and detailed descriptions of them that are considered redundant may be arbitrarily omitted.

FIG. 1 is a plan view showing a configuration example of a display device DSP of the present embodiment. In the present embodiment, a liquid crystal display device will be described as an example of the display device DSP.

The display device DSP includes a display panel PNL and an IC chip 1. For the sake of convenience, a direction in which short sides of the display panel PNL extend will be referred to as a first direction X, a direction in which long sides of the display panel PNL extend will be referred to as a second direction Y, and a thickness direction of the display panel PNL will be referred to as a third direction Z. The first direction X, the second direction Y and the third direction Z are, for example, orthogonal to each other but may cross one another at an angle other than 90 degrees.

The display panel PNL includes a first display portion DA1 and a second display portion DA2 which display images, and a first light shield LS1 and a second light shield LS2. The first display portion DA1 and the second display portion DA2 are arranged in the second direction Y. The first display portion DA1 includes a plurality of first pixels PX1. The second display portion DA2 includes a plurality of second pixels PX2. The first pixels PX1 and the second pixels PX2 are arranged in a matrix in the first direction X and the second direction Y. The configuration of the first pixels PX1 and second pixels PX2 will be described later. The first display portion DA1 and the second display portion DA2 have a rectangular shape in the example shown in FIG. 1 but may have another polygonal shape or a circular shape or an elliptical shape.

The first light shield LS1 and the second light shield LS2 are indicated by hatched lines. The first light shield LS1 is disposed so as to surround both the first display portion DA1 and the second display portion DS2. The second light shield LS2 is disposed between the first display portion DA1 and the second display portion DA2. The second light shield LS2 is connected to the first light shield LS1. In the example shown in FIG. 1, the first light shield LS1 is formed along the outer edges of the display panel PNL and has the shape of a frame. In addition, the second light shield LS2 is formed in a substantially central portion of the display panel PNL and has the shape of a straight line extending in the first direction X. Each of the first display portion DA1 and the second display portion DA2 is defined by the first light shield LS1 and the second light shield LS2.

The display panel PNL includes a first substrate SUB1, a second substrate SUB2, a liquid crystal layer LC, a first sealant SE1 and a second sealant SE2. The second substrate SUB2 overlaps the first substrate SUB1 in the third direction Z. For example, the first light shield LS1 and the second light shield LS2 are disposed in the second substrate SUB2. The liquid crystal layer LC is made of a liquid crystal material including liquid crystal molecules, is provided between the first substrate SUB1 and the second substrate SUB2 in the first display portion DA1 and the second display portion DA2. The cell gap between the first substrate SUB1 and the second substrate SUB2 is formed by spacers disposed respectively in the first display portion DA1 and the second display portion DA2. Each of the first sealant SE1 and the second sealant SE2 includes a filler (in-sealant spacer) and contributes to maintenance of the cell gap.

The entire first sealant SE1 overlaps the first light shield LS1, and the first sealant SE1 bonds the first substrate SUB1 and the second substrate SUB2 together and seals the liquid crystal layer LC in the first display portion DA1 and the second display portion DA2. In one example, the first sealant SE1 has the shape of an unbroken continuous loop, and does not have a liquid crystal injection opening.

The entire second sealant SE2 overlaps the second light shield LS2, and as is the case with the first sealant SE1, the second sealant SE2 bonds the first substrate SUB1 and the second substrate SUB2 together. The second sealant SE2 has at least one opening OP through which the first display portion DA1 and the second display portion DA2 communicate. In the example shown in FIG. 1, the second sealant SE2 is spaced apart from the first sealant SE1 and has two openings OP1 and OP2.

More specifically, the second sealant SE2 includes a first portion SE21 facing the first display portion DA1 and a second portion SE22 facing the second display portion DA2. The second portion SE22 is spaced apart from the first portion SE21. The first portion SE21 and the second portion SE22 are arranged in the second direction Y. The liquid crystal layer LC exists between the first portion SE21 and the second portion SE22. Each of the first portion SE21 and the second portion SE22 has the shape of a straight line extending in the first direction X. Both ends EA1 and EB1 of the first portion SE21 and both ends EA2 and EB2 of the second portion SE22 are spaced apart from the first sealant SE1. An opening OP1 is formed between the ends EA1 and EA2 and the first sealant SE1. An opening OP2 is formed between the ends EB1 and EB2 and the first sealant SE1. Through the openings OP1 and OP2, the liquid crystal material in the first display portion DA1 flows to the second display portion DA2 or the liquid crystal material in the second display portion DA2 flows to the first display portion DA1.

In other words, the first display portion DA1 has a first chamber surrounded by the first substrate SUB1, the second substrate SUB2, the first sealant SE1 and the second sealant SE2, and the second display portion DA2 has a second chamber surrounded by the first substrate SUB1, the second substrate SUB2, the first sealant SE1 and the second sealant SE2. In addition, a plurality of communication paths (or openings OP) through which the first chamber and the second chamber communicate are formed at the second sealant SE2 (or between the first sealant SE1 and the second sealant SE2). The first chamber, the second chamber and the communication paths are filled with the liquid crystal layer LC. Consequently, the liquid crystal material of the liquid crystal layer LC can flow from the first chamber to the second chamber and from the second chamber to the first chamber through the communication paths.

The display panel PNL is manufactured, for example, in the following manner. That is, the first sealant SE1 having the shape of a loop and the second sealant SE2 having the shape of a straight line are formed on the first substrate SUB1, the liquid crystal material is dropped to the inside surrounded by the first sealant SE1, and subsequently the first substrate SUB1 and the second substrate SUB2 are bonded together with the first sealant SE1. Here, the first sealant SE1 overlaps the first light shield LS1 disposed in the second substrate SUB2, and the second sealant SE2 overlaps the second light shield LS2 disposed in the second substrate SUB2. The amount of the liquid crystal material to be dropped is set based on the cell gap between the first substrate SUB1 and the second substrate SUB2, etc. In the step of dropping the liquid crystal material, even if the amount of the liquid crystal material dropped is less than a set value, since the liquid crystal material can flow through the openings OP, the volume of the liquid crystal material over the first display portion DA1 and the second display portion DA2 is evened out. Therefore, the difference of display quality due to the uneven distribution of the liquid crystal material between the first display portion DA1 and the second display portion DA2 are reduced. In addition, a margin of the set value of the amount to be dropped can be increased.

Furthermore, for example, if a load is applied to the first display portion DA1, the liquid crystal material of the first display portion DA1 moves (flows out) to the second display portion DA2 through the openings OP, and after the load is released, the liquid crystal material of the second display portion DA2 moves (flows in) to the first display portion DA1 through the openings OP. When the load is applied, the liquid crystal material flows and the display panel PNL may be distorted (with the cell gap locally reduced); however, when the load is released, the distortion of the display panel PNL can go back to as it was with the inflow of the liquid crystal material, and the cell gap can go back to a state prior to the distortion. Therefore, when the load is released, the display is quickly restored to a state prior to the application of the load.

Furthermore, since the second sealant SE2 is disposed between the first display portion DA1 and the second display portion DA2, the second sealant functions as an adhesive portion which bonds the first substrate SUB1 and the second substrate SUB2 together at the central portion of the entire display panel PNL. This prevents a warp of the substrates at the central portion of the display panel PNL (including a portion closely located between the first display portion DA1 and the second display portion DA2). Therefore, a degradation of the display quality can be suppressed.

The first substrate SUB1 has a mounting portion MA. The IC chip 1 is mounted on the mounting portion MA. The mounting portion MA includes a terminal portion TA which electrically connects a flexible printed circuit board 2 indicated by a dotted line in FIG. 1. Note that the IC chip 1 may be mounted on the flexible printed circuit board 2.

A configuration example shown in FIG. 2A differs from the configuration example shown in FIG. 1 in that the second sealant SE2 has the shape of one straight line extending in the first direction X and the width of the second sealant SE2 is greater than the width of the first sealant SE1. For example, the first sealant SE1 has a width W1 which is substantially constant along its entire circumference. The second sealant SE2 has a substantially constant width W2. The width W2 is greater than the width W1.

A configuration example shown in FIG. 2B differs from the configuration example shown in FIG. 1 in that the second sealant SE2 has the shape of one straight line extending in the first direction X and the width of the second sealant SE2 is equal to the width of the first sealant SE1 or is less than the width of the first sealant SE1. In the example illustrated, the width W1 of the first sealant SE1 and the width W2 of the second sealant SE2 are substantially equal. Note that the width W2 may be less than the width W1 in some cases.

Note that the width W2 is equal to a width W12 of the second light shield LS2 or is less than the width W12 at most in the both configuration examples.

FIG. 3 is a plan view showing another configuration example of the display device DSP. The configuration example shown in FIG. 3 differs from the configuration example shown in FIG. 1 in that the first sealant SE1 and the second sealant SE2 are integrally formed without a break. That is, the second sealant SE2 is continuous with the first sealant SE1. The second sealant SE2 has one opening OP.

More specifically, the second sealant SE2 includes a first portion SE21, a second portion SE22 and a third portion SE23. The second portion SE22 is spaced apart from the first portion SE21. The third portion SE23 connects the first portion SE21 and the second portion SE22. The liquid crystal layer LC does not exist between the first portion SE21 and the second portion SE22. The opening OP is formed between two third portions SE23.

In a case where the first sealant SE1 and the second sealant SE2 of the configuration example shown in FIG. 3 are drawn by a dispenser, the first sealant SE1 and the second sealant SE2 can be unicursally drawn.

A configuration example shown in FIG. 4A differs from the configuration example shown in FIG. 3 in that the second sealant SE2 has the shape of a straight line extending in the first direction X and the width W2 of the second sealant SE2 is greater than the width W1 of the first sealant SE1.

A configuration example shown in FIG. 4B differs from the configuration example shown in FIG. 3 in that the second sealant SE2 has the shape of a straight line extending in the first direction X and the width W2 of the second sealant SE2 is equal to the width W1 of the first sealant SE1 or is less than the width W1.

FIG. 5 is a plan view showing another configuration example of the display device DSP. The configuration example shown in FIG. 5 differs from the configuration example shown in FIG. 3 in that a third sealant SE3 overlapping the second light shield LS2 is disposed. As is the case with the configuration example shown in FIG. 3, the first sealant SE1 and the second sealant SE2 are integrally formed without a break. That is, the second sealant SE2 is continuous with the first sealant SE1. At least one of the third sealants SE3 is disposed between a pair of the third portions SE23 of the second sealant SE2. In the example shown in FIG. 5, two of the third sealants SE3 are disposed with a space in between in the first direction X. The third sealants SE3 are spaced apart from the second sealant SE2, respectively. The openings OP are formed between the second sealant SE2 and one third sealant SE3, between the second sealant SE2 and the other third sealant SE3, and between two third sealants SE3 arranged in the first direction X, respectively.

A configuration example shown in FIG. 6A differs from the configuration example shown in FIG. 5 in that the second sealant SE2 and the third sealants SE3 have the shape of a straight line extending in the first direction X, the width W2 of the second sealant SE2 and a width W3 of the third sealants SE3 are greater than the width W1 of the first sealant SE1.

A configuration example shown in FIG. 6B differs from the configuration example shown in FIG. 5 in that the second sealant SE2 and the third sealants SE3 have the shape of a straight line extending in the first direction X, and the with W2 of the second sealant SE2 and the width W3 of the third sealants SE3 are equal to the width W1 of the first sealant SE1 or are less than the width W1.

Figure 7:
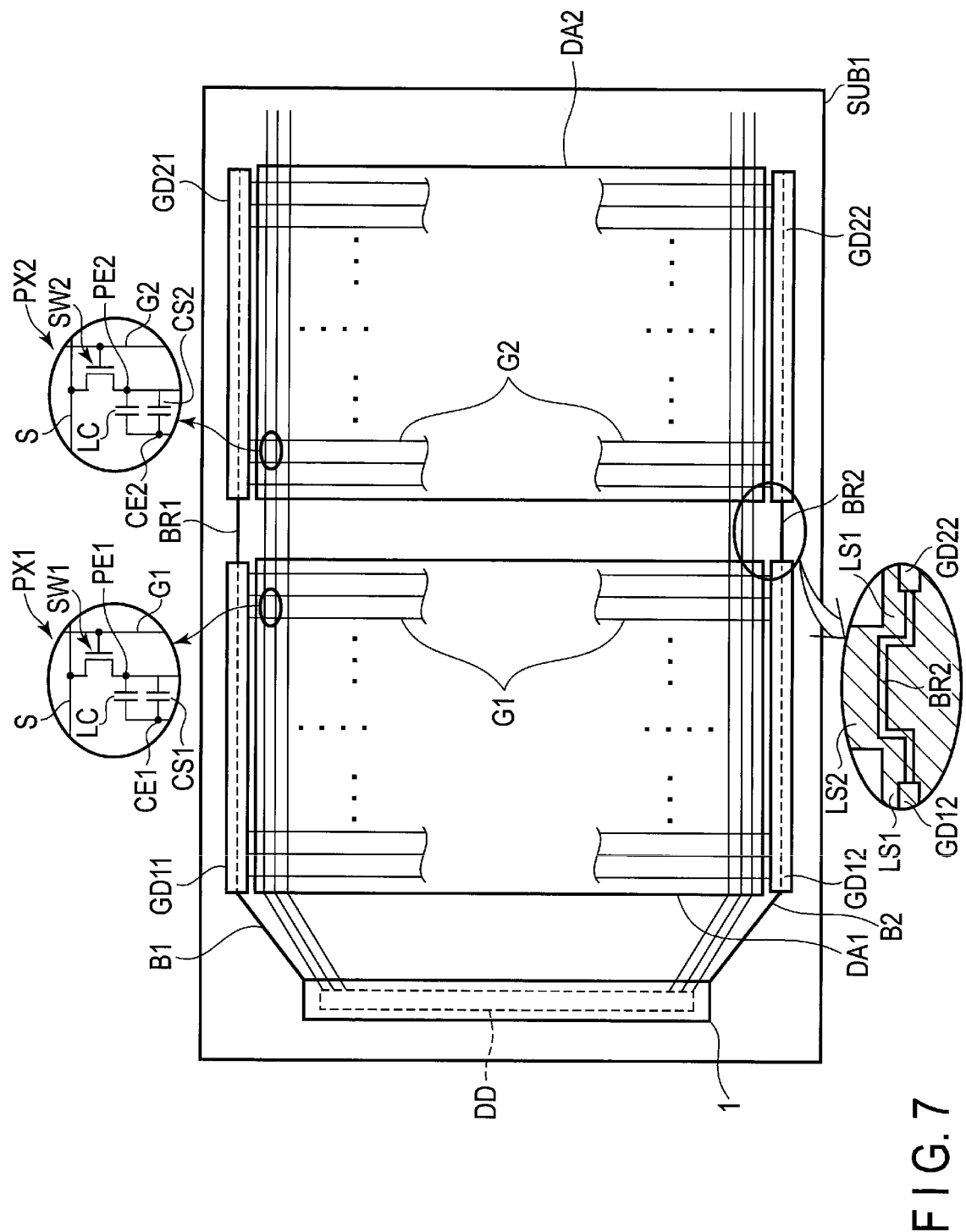
FIG. 7 is a diagram for explaining the main configuration of a first substrate SUB1.

FIG. 7 is a diagram for explaining the main configuration of the first substrate SUB1.

The first substrate SUB1 includes a plurality of scanning lines G1 disposed in the first display portion DA1, a plurality of scanning lines G2 disposed in the second display portion DA2, and a plurality of signal lines S disposed over the first display portion DA1 and the second display portion DA2.

The first substrate SUB1 includes gate drivers GD11 and GD12 disposed along the first display portion DA1 and gate drivers GD21 and GD22 disposed along the second display portion DA2. The gate drivers GD11 and GD21 are connected to each other via a bus line B1. The gate drivers GD12 and GD22 are connected to each other via a bus line B2. The bus lines B1 and B2 are electrically connected to the IC chip 1, for example. Each of the bus lines B1 and B2 includes, for example, a line for supplying a start pulse, a line for supplying a clock, a high-potential power supply line (VGH), a low-potential power supply line (VGL), and the like. A part of the bus line B1 between the gate driver GD11 and the gate driver GD21 will be referred to as a relay portion BR1. In addition, a part of the bus line B2 between the gate driver GD12 and the gate driver GD22 will be referred to as a relay portion BR2. The circuit configurations are not included in the relay portions BR1 and BR2. Here, attention will be focused on the relationship between the first light shield LS1 and the second light shield LS2 shown in FIG. 1, etc., and the gate drivers GD12 and GD22. The gate drivers GD12 and GD22 overlap the first light shield LS1. The relay portion BR2 is disposed in a connection portion (crossing portion) in which first light shield LS1 and the second light shield LS2 are connected to each other (cross each other). The circuit configurations of the gate drivers GD12 and GD22 are not disposed near the connection portion. Note that the relay portion BR1 is disposed in a connection portion in the same manner.

The scanning lines G1 are electrically connected to at least one of the gate drivers GD11 and GD12. The scanning lines G2 are electrically connected to at least one of the gate drivers GD21 and GD22.

A display driver DD is incorporated in the IC chip 1. The display driver DD outputs a signal necessary for image display such as a video signal to the display panel PNL in an image display mode of displaying an image. The signal lines S are electrically connected to the display driver DD. Each signal line S is electrically connected to one of the plurality of the first pixels PX1 and one of the plurality of the second pixels PX2.

In the first pixel PX1, for example, the first substrate SUB1 includes a switching element SW1 and a pixel electrode PE1. The switching element SW1 electrically connects the scanning line G1 and the signal line S. The pixel electrode PE1 is electrically connected to the switching element SW1. The first substrate SUB1 further includes a common electrode CE1. The common electrode CE1 is an electrode common to the first pixels PX1. Note that the common electrode CE1 may be disposed in the second substrate SUB2. For example, storage capacitance CS1 is formed between an electrode having the same potential as the common electrode CE1 and an electrode having the same potential as the pixel electrode PE1. In the first display portion DA1, the liquid crystal layer LC is driven by an electric field generated between the pixel electrode PE1 and the common electrode CE1.

In the second pixel PX2, the first substrate SUB1 includes a switching element SW2 and a pixel electrode PE2. The switching element SW2 is electrically connected to the scanning line G2 and the signal line S. The pixel electrode PE2 is electrically connected to the switching element SW2. The first substrate SUB1 also includes a common electrode CE2. The common electrode CE2 is an electrode common to the second pixels PX2. Note that the common electrode CE2 may be disposed in the second substrate SUB2. For example, capacitance CS2 is formed between an electrode having the same potential as the common electrode CE2 and an electrode having the same potential as the pixel electrode PE2. In the second display portion DA2, the liquid crystal layer LC is driven by an electric field generated between the pixel electrode PE2 and the common electrode CE2. Note that the first pixel PX1 and the second pixel PX2 include color filters, respectively, and the color filters may be disposed in the first substrate SUB1 or may be disposed in the second substrate SUB2.

In FIG. 7, for example, the scanning line G1 corresponds to the first scanning line, the scanning line G2 corresponds to the second scanning line, the switching element SW1 corresponds to the first switching element, the switching element SW2 corresponds to the second switching element, the pixel electrode PE1 corresponds to the first pixel electrode, the pixel electrode PE2 corresponds to the second pixel electrode, the common electrode CE1 corresponds to the first common electrode, and the common electrode CE2 corresponds to the second common electrode.

Figure 8:
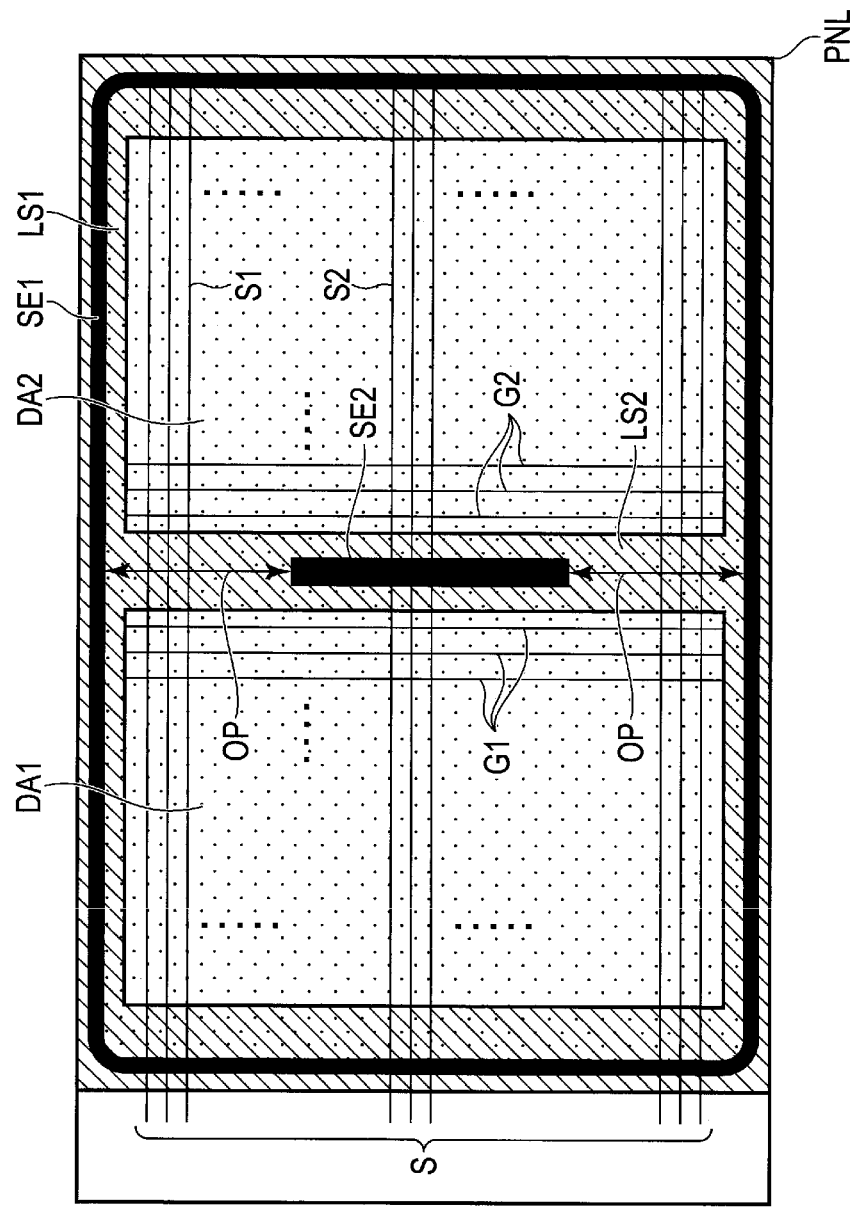
FIG. 8 is a plan view showing the relationship between signal lines S and a second sealant SE2.

FIG. 8 is a plan view showing the relationship between the signal lines S and the second sealant SE2.

Each signal line S crosses the second light shield LS2 and is continuously disposed over the first display portion DA1 and the second display portion DA2. A first signal line S1 of the signal lines S overlaps the opening OP between the first sealant SE1 and the second sealant SE2 in the second light shield LS2. In addition, a second signal line S2 crosses the second sealant SE2 in the second light shield LS2.

Note that there is no scanning line overlapping the second light shield LS2 and the second sealant SE2. Alternatively, there is no line crossing the signal lines S in a region overlapping the second light shield LS2 and the second sealant SE2.

Figure 9:
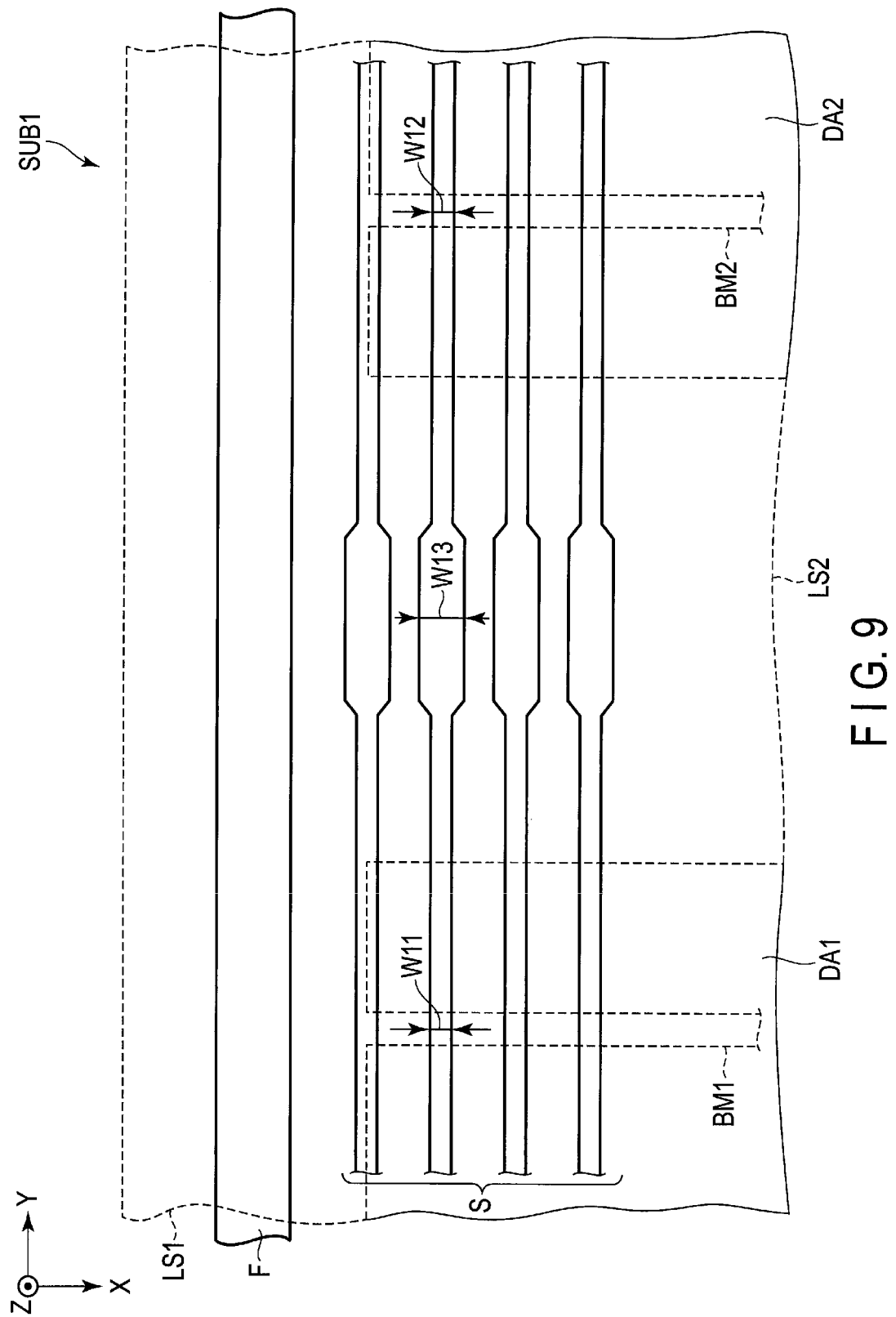
FIG. 9 is an enlarged view of the signal lines S crossing a second light shield LS2 in the first substrate SUB1.

FIG. 9 is an enlarged plan view of the signal lines S crossing the second light shield LS2 in the first substrate SUB1. In FIG. 9, the first light shield LS1 and the second light shield LS2 are indicated by dotted lines. The first light shield LS1 is connected to light shields BM1 disposed in the first display portion DA1 and light shields BM2 disposed in the second display portion DA2. The light shields BM1 and BM2 extend in the first direction X. The light shields BM1 are disposed so as to overlap the scanning lines G1 shown in FIG. 8, etc. The light shields BM2 are disposed so as to overlap the scanning lines G2.

The signal lines S cross the light shields BM1 in the first display portion DA1, cross the second light shield LS2, and cross the light shields BM2 in the second display portion DA2. The signal lines S have a width W11 in the first display portion DA1, a width W12 in the second display portion DA2, and a width W13 in the second light shield LS2. The width W11 in a position overlapping the light shields BM1 is substantially equal to the width W12 in a position overlapping the light shields BM2. The width W13 is greater than the widths W11 and W12.

The signal lines S are disposed over the first display portion DA1 and the second display portion DA2 as described above, but expanding the width of the signal lines S where the signal lines S cross the second light shield LS2 suppress an increase of the line resistance of the signal lines S. In addition, as described with reference to FIG. 8, no line crosses the signal lines S under the second light shield LS2, capacitive coupling with the other lines can be suppressed despite the expansion of the width of the signal lines S.

A feed line F for supplying a common potential to the first common electrode CE1 and the second common electrode CE2 is disposed in a region overlapping the first light shield LS1. For example, the feed line F is disposed in the same layer as the signal lines S are disposed. The detail will be described later.

Figure 10:
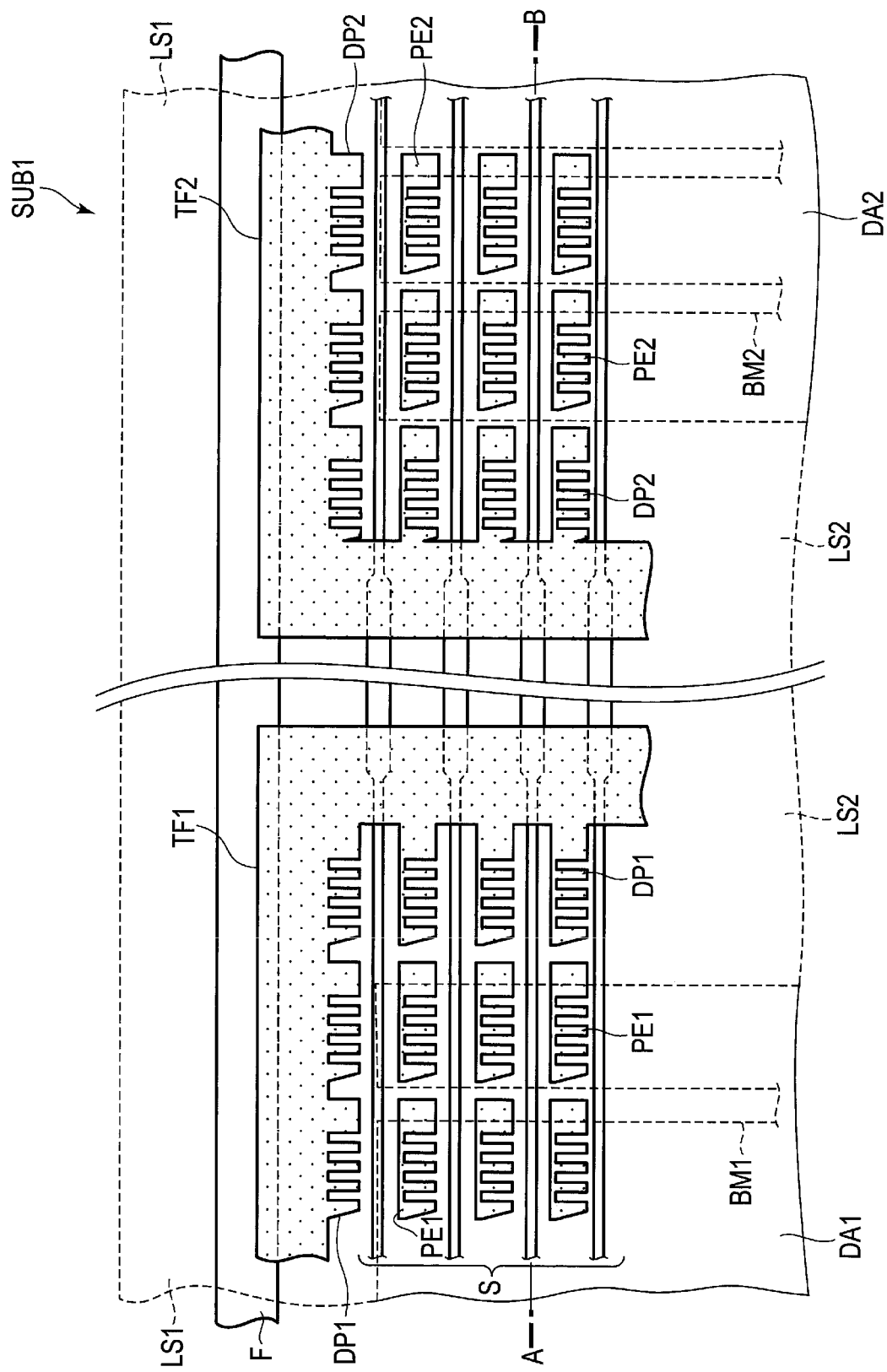
FIG. 10 is a plan view showing part of a first display portion DA1 and part of a second display portion DA2 in the first substrate SUB1.

FIG. 10 is a plan view showing part of the first display portion DA1 and part of the second display portion DA2 in the first substrate SUB1. Here, only main portions necessary for explanation are illustrated.

The first substrate SUB1 includes a first conductive film TF1 and a second conductive film TF2. Each of the first conductive film TF1 and the second conductive film TF2 overlaps the first light shield LS1 and the second light shield LS2. The second conductive film TF2 is spaced apart from the first conductive film TF1. Part of the first conductive film TF1 and part of the second conductive film TF2 overlap the feed line F.

The first conductive film TF1 is disposed around the first display portion DA1 and is spaced apart from the first pixel electrodes PE1. The first conductive film TF1 has a dummy pattern DP1, the shape of which is substantially the same as the first pixel electrodes PE1, on its side adjacent to the first display portion DA1. The second conductive film TF2 is disposed around the second display portion DA2 and is spaced apart from the second pixel electrodes PE2. The second conductive film TF2 has a dummy pattern DP2, the shape of which is substantially the same as the second pixel electrodes PE2, on its side adjacent to the second display portion DA2. Each of the dummy patterns DP1 and DP2 overlaps the first light shield LS1 and the second light shield LS2.

In the example shown in FIG. 10, the light shields BM1 extend in the first direction X but do not extend in the second direction Y in the first display portion DA1. That is, each light shield BM1 is disposed between the first pixel electrodes PE1 adjacent to each other in the second direction Y, but not disposed so as to extend in the second direction Y with overlapping the signal line S. In the second display portion DA2 also, each light shield BM2 is disposed between the second pixel electrodes PE2 adjacent to each other in the second direction Y. Note that light shields may extend in the second direction Y with overlapping the signal lines S.

Figure 11:
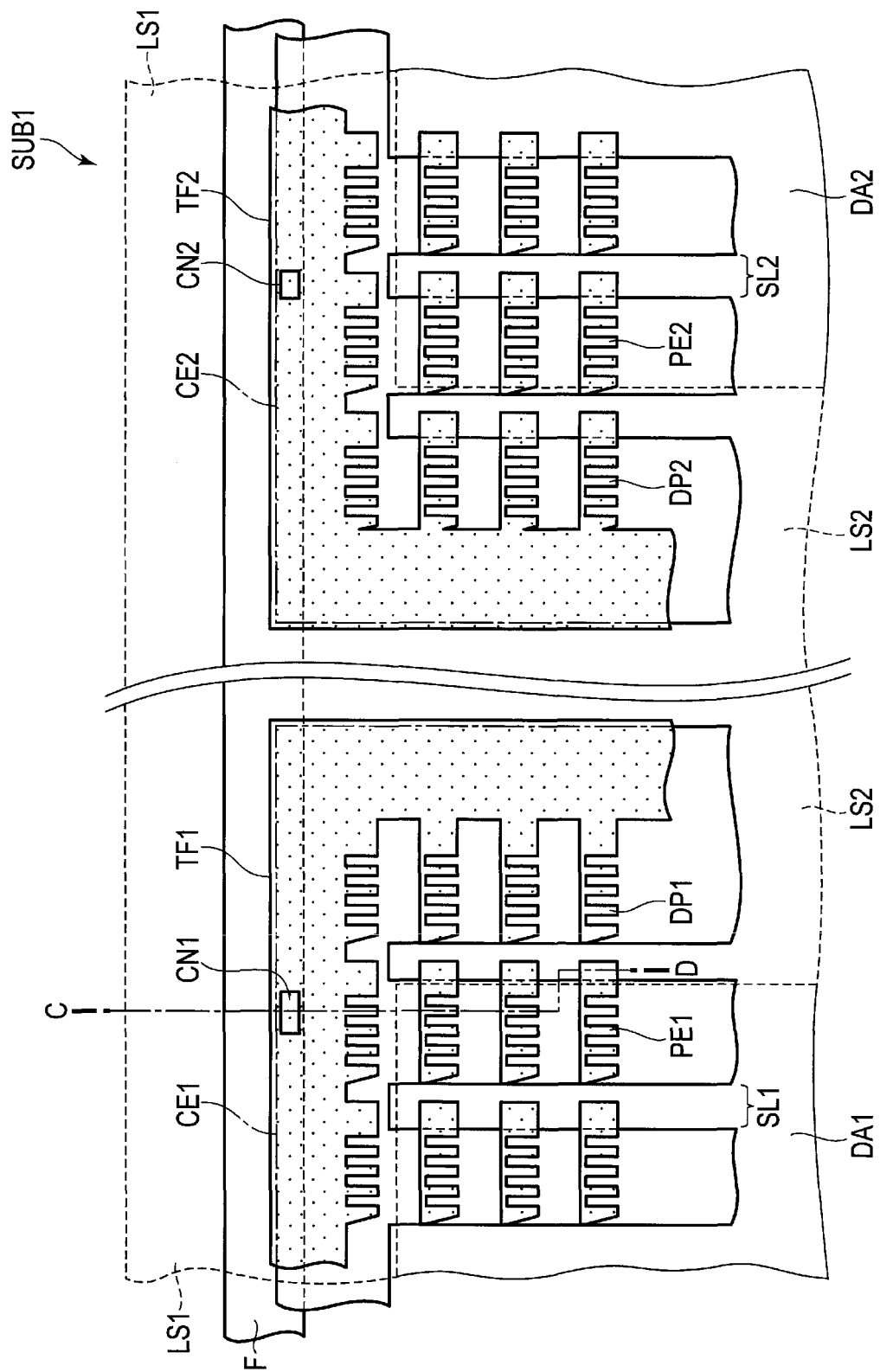
FIG. 11 is a plan view showing part of the first display portion DA1 and part of the second display portion DA2 in the first substrate SUB1.

FIG. 11 is a plan view showing part of the first display portion DA1 and part of the second display portion DA2 in the first substrate SUB1. Here, only main portions necessary for explanation are illustrated.

The first common electrode CE1 overlaps the first pixel electrodes PE1 in the first display portion DA1. The first common electrode CE1 has slits SL1 in the first display portion DA1. The slits SL1 overlap the light shields BM1 shown in FIG. 10. In addition, the first common electrode CE1 overlaps the first conductive film TF1 including the dummy pattern DP1. Each of the first conductive film TF1 and the first common electrode CE1 overlaps the first light shield LS1 and the second light shield LS2. The feed line F, the first common electrode CE1 and the first conductive film TF1 are electrically connected to one another in a first connection CN1 overlapping the first light shield LS1. That is, the first conductive film TF1 has the same potential as the first common electrode CE1.

As described above, around the first display portion DA1, the dummy pattern DP1 of the first conductive film TF1 and the first common electrode CE1 overlap each other and have the same potential each other. This allows the liquid crystal molecules to stay in an initial alignment state. For example, in a normally black mode that displays black during an off state where no electric field is formed between the first pixel electrodes PE1 and the first common electrode CE1, the liquid crystal molecules around the first display portion DA1 are maintained in a state where black is displayed.

The second common electrode CE2 is spaced apart from the first common electrode CE1. The second common electrode CE2 overlaps the second pixel electrodes PE2 in the second display portion DA2. The second common electrode CE2 has slits SL2 in the second display portion DA2. The slits SL2 are disposed so as to overlap the light shields BM2 shown in FIG. 10. In addition, the second common electrodes CE2 overlap the second conductive film TF2 including the dummy pattern DP2. Each of the second conductive film TF2 and the second common electrode CE2 overlaps the first light shield LS1 and the second light shield LS2. The feed line F, the second common electrode CE2 and the second conductive film TF2 are electrically connected to one another in a second connection CN2 overlapping the first light shield LS1. Around the second display portion DA2 also, the dummy pattern DP2 of the second conductive film TF2 and the second common electrode CE2 overlap each other and have the same potential as each other. This allows the liquid crystal molecules to stay in an initial alignment state. That is, around the second display portion DA2 also, the liquid crystal molecules are maintained in a state where black is displayed.

Figure 12:
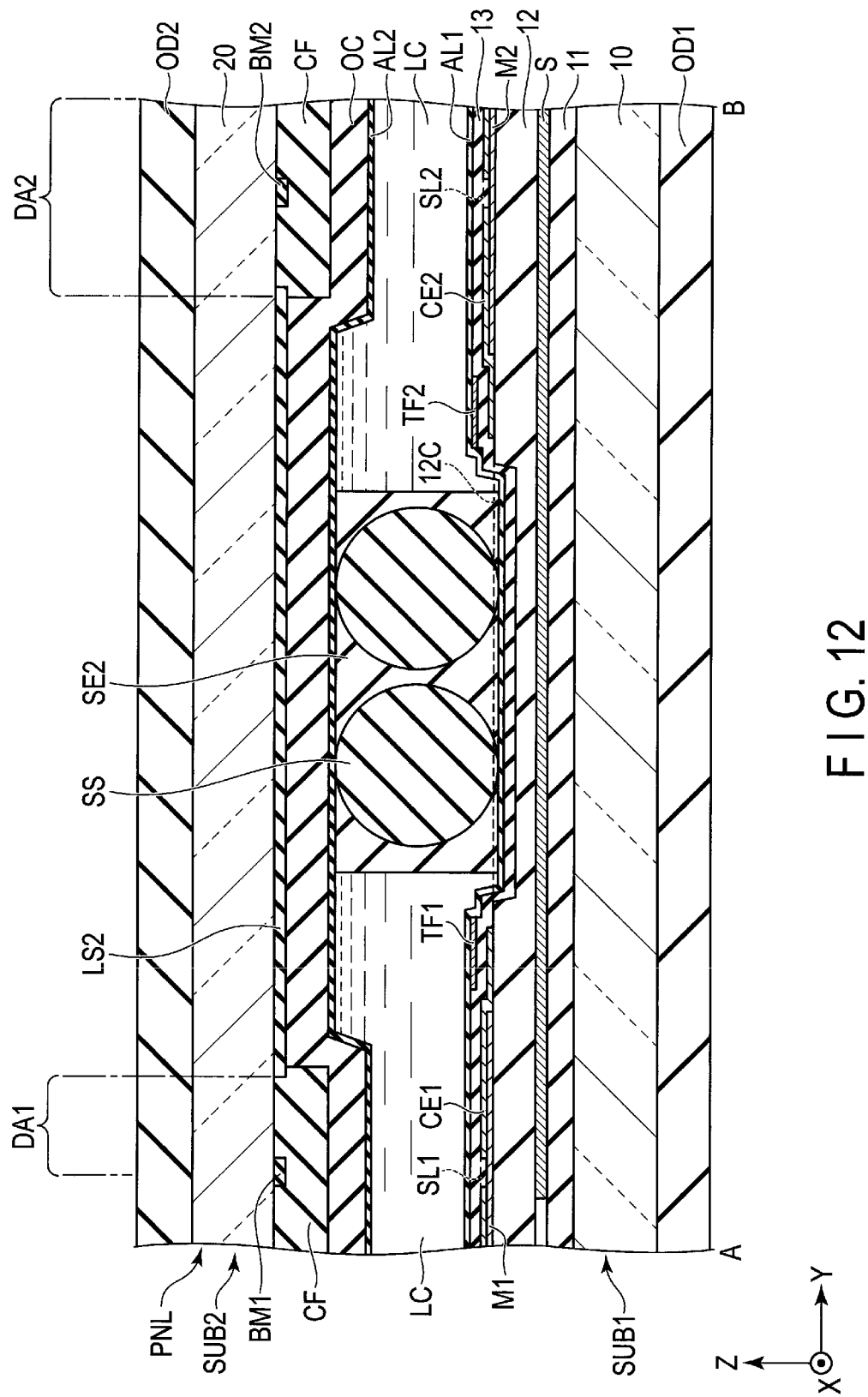
FIG. 12 is a cross-sectional view of a display panel PNL taken along line A-B on the signal line S shown in FIG. 10.

FIG. 12 is a cross-sectional view of the display panel PNL taken along line A-B on the signal line S shown in FIG. 10.

The first substrate SUB1 includes an insulating substrate 10, insulating films 11 to 13, the signal line S, metal lines M1 and M2, the first common electrode CE1, the second common electrode CE2, the first conductive film TF1, the second conductive film TF2, an alignment film AL1, and the like. Note that the scanning lines G1 and G2 and the switching elements SW1 and SW2 shown in FIG. 7 are disposed between the insulating substrate 10 and the insulating film 11. The signal line S is disposed between the insulating films 11 and 12. The metal lines M1 and M2 are disposed between the insulating films 12 and 13. Although illustrations of the metal lines M1 and M2 are omitted in FIGS. 10 and 11, the metal lines M1 and M2 extend in the second direction Y and are disposed so as to overlap the signal line S. The metal line M1 corresponding to a first metal line crosses the slit SL1 and is in contact with the first common electrode CE1. As a result, parts of the first common electrode CE1 arranged in the second direction Y via the slit SL1 are electrically connected to each other by the metal line M1. This allows to lower resistivity of the first common electrode CE1. In the slit SL1, the metal line M1 is covered with the insulating film 13. In addition, the metal line M2 corresponding to a second metal line crosses the slit SL2 and is in contact with the second common electrode CE2. As a result, parts of the second common electrode CE2 arranged in the second direction Y are electrically connected to each other by the metal line M2. This allows to lower resistivity of the second common electrode CE2. In the slit SL2, the metal line M2 is covered with the insulating film 13. The metal line M1 in the first display portion DA1 and the metal line M2 in the second display portion DA2 overlap the same signal line S. The metal line M1 is spaced apart from the metal line M2. The metal lines M1 and M2 are not disposed between the first display portion DA1 and the second display portion DA2.

The first conductive film TF1 and the second conductive film TF2 are disposed between the insulating film 13 and the alignment film AL1. In the cross-sectional view of FIG. 12, the insulating film 13 is interposed between the first common electrode CE1 and the first conductive film TF1 and between the second common electrode CE2 and the second conductive film TF2.

The second substrate SUB2 includes an insulating substrate 20, the light shields BM1 and BM2, the second light shield LS2, a color filter layer CF, an overcoat layer OC, an alignment film AL2, and the like. The color filter layer CF crosses the light shield BM1 in the first display portion DA1 and crosses the light shield BM2 in the second display portion DA2.

Each of the insulating substrates 10 and 20 is a transparent substrate such as a glass substrate or a resin substrate. Each of the insulating films 11 and 13 is a transparent inorganic film. Each of the insulating film 12 and the overcoat layer OC is a transparent organic film. Each of the signal line S and the metal lines M1 and M2 is formed of a non-transparent metal material. Each of the first common electrode CE1, the second common electrode CE2, the first conductive film TF1 and the second conductive film TF2 is formed of a transparent conductive material.

The second sealant SE2 is disposed between the first common electrode CE1 and the second common electrode CE2 directly below the second light shield LS2. Alternatively, the second sealant SE2 is disposed between the first conductive film TF1 and the second conductive film TF2. Part of the first substrate SUB1 under the second sealant SE2 has the insulating film 11, the signal line S, the insulating film 12, the insulating film 13 and the alignment film AL1 which are stacked in order from the insulating substrate 10 to the second sealant SE2. Part of the second substrate SUB2 above the second sealant SE2 has the second light shield LS2, the overcoat layer OC and the alignment film AL2 which are stacked in order from the insulating substrate 20 to the second sealant SE2.

The second sealant SE2 includes an in-sealant spacer SS (referred to also as a filler) as described above. The second sealant SE2 is in contact with the alignment films AL1 and AL2.

In the example shown in FIG. 12, the insulating film 12 has a recess 12C between the first display portion DA1 and the second display portion DA2. That is, part of the insulating film 12 is thinned. The second sealant SE2 overlaps the recess 12C. Therefore, when the second sealant SE2 is formed, spread of the second sealant SE2 toward the first display portion DA1 and the second display portion DA2 is suppressed. In addition, in a case where a load is applied to the central portion of the display panel PNL, displacement of the second sealant SE2 toward the first display portion DA1 or second display portion DA2 is suppressed.

Each of a first optical element OD1 and a second optical element OD2 includes at least a polarizer and may include a retarder, etc., when needed. The first optical element OD1 is bonded to the insulating substrate 10, and the second optical element OD2 is bonded to the insulating substrate 20.

Figure 13:
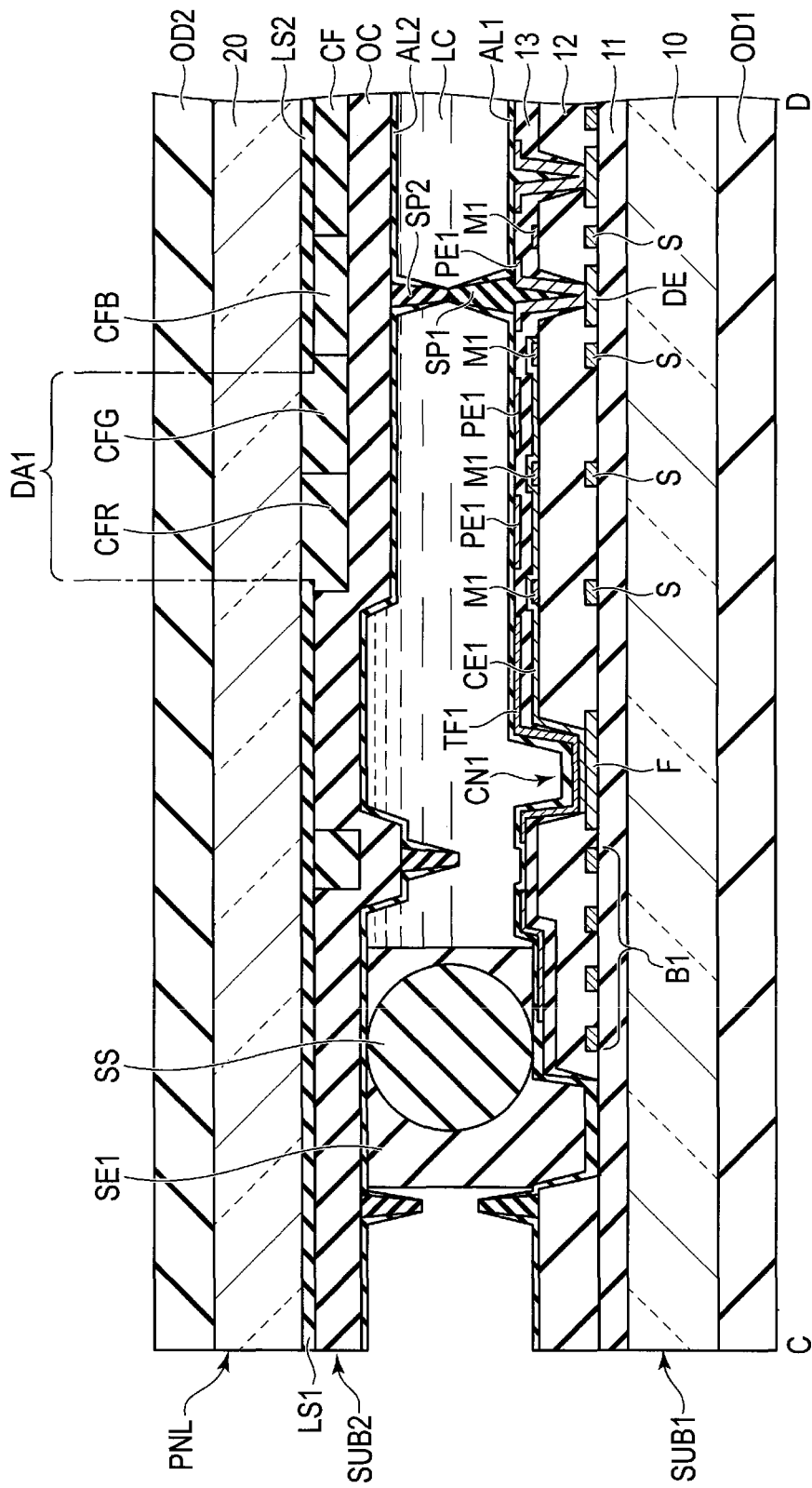
FIG. 13 is a cross-sectional view of the display panel PNL taken along line C-D shown in FIG. 11.

FIG. 13 is a cross-sectional view of the display panel PNL taken along line C-D shown in FIG. 11.

In the first substrate SUB1, as is the case with the signal line S, a drain electrode DE of the switching element, the feed line F and the bus line B1 are disposed between the insulating films 11 and 12. The metal line M1 overlaps the signal line S. The first common electrode CE1 is in contact with and electrically connects to the feed line F in the first connection CN1. The first conductive film TF1 is in contact with and electrically connects to the first common electrode CE1 in the first connection CN1. As is the case with the first conductive film TF1, the first pixel electrode PE1 is disposed between the insulating film 13 and the alignment film AL1. In the second display portion DA2, which is not illustrated in the drawing, the second pixel electrode PE2 is also disposed between the insulating film 13 and the alignment film AL1. The first pixel electrode PE1 and the second pixel electrode PE2 are formed of the same transparent conductive material as the first conductive film TF1. The first pixel electrode PE1 is in contact with the drain electrode DE of the switching element and is electrically connected to the drain electrode DE. A first spacer SP1 is disposed in a connection in which the first pixel electrode PE1 and the drain electrode DE are electrically connected to each other.

In the second substrate SUB2, as is the case with the second light shield LS2, the first light shield LS1 is disposed between the insulating substrate 20 and the overcoat layer OC. The color filter layer CF includes a red color filter CFR, a green color filter CFG and a blue color filter CFB. The color filter layer CF is disposed not only in the first display portion DA1 but also in the second display portion DA2. Part of the color filter layer CF overlaps the second light shield LS2. A second spacer SP2 overlaps the second light shield LS2 and is in contact with the first spacer SP1. The first spacer SP1 and the second spacer SP2 form a cell gap.

The first sealant SE1 is disposed directly below the first light shield LS1 and is in contact with the alignment films AL1 and AL2. As is the case with the second sealant SE2, the first sealant SE1 includes an in-sealant spacer SS (referred to also as a filler).

As described above, according to the present embodiment, a display device which suppresses display quality degradation can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first display portion including a plurality of first pixels;
a second display portion including a plurality of second pixels;
a first light shield surrounding the first display portion and the second display portion;
a second light shield disposed between the first display portion and the second display portion;
a liquid crystal layer;
a first sealant overlapping the first light shield, sealing the liquid crystal layer, and having a shape of a continuous loop surrounding the first display portion and the second display portion; and
a second sealant overlapping the second light shield, wherein
the second sealant has an opening through which the first display portion and the second display portion communicate,
the liquid crystal layer includes a first part disposed in the first pixels, a second part disposed in the second pixels, and a third part filled in the opening,
the first part and the second part are integrally formed with the third part,
a width of the opening is greater than a width of one of the first pixels, and is greater than a width of one of the second pixels, and
the one of the first pixels faces the one of the second pixels through the opening.

2. The display device of claim 1, wherein
the second sealant includes a first portion facing the first display portion and a second portion facing the second display portion, and
the second portion is spaced apart from the first portion.

3. The display device of claim 1, wherein a width of the second sealant is greater than a width of the first sealant.

4. The display device of claim 1, wherein
a width of the second sealant is equal to a width of the first sealant, or
the width of the second sealant is less than the width of the first sealant.

5. The display device of claim 1, wherein the second sealant is spaced apart from the first sealant.

6. The display device of claim 1, wherein the second sealant is continuous with the first sealant.

7. The display device of claim 1, further comprising a signal line disposed over the first display portion and the second display portion and crossing the second light shield, wherein the signal line is electrically connected to the one of the first pixels and the one of the second pixels.

8. The display device of claim 7, wherein the signal line overlaps the opening.

9. The display device of claim 7, wherein the signal line crosses the second sealant.

10. The display device of claim 7, wherein
the signal line has a first width in the first display portion and a second width in the second light shield, and
the second width is greater than the first width.

11. The display device of claim 7, further comprising:
a first metal line overlapping the signal line in the first display portion; and
a second metal line overlapping the signal line in the second display portion, wherein
the first metal line is spaced apart from the second metal line.

12. The display device of claim 1, further comprising:
a first pixel electrode disposed in the one of the first pixels in the first display portion;
a first conductive film disposed around the first display portion and spaced apart from the first pixel electrode; and
a first common electrode overlapping both the first pixel electrode and the first conductive film, wherein
each of the first conductive film and the first common electrode overlaps the first light shield and the second light shield.

13. The display device of claim 12, further comprising:
a second conductive film disposed around the second display portion and spaced apart from the first conductive film; and
a second common electrode spaced apart from the first common electrode and overlapping the second conductive film, wherein
the second sealant is disposed between the first common electrode and the second common electrode.

14. The display device of claim 12, further comprising a feed line overlapping the first light shield, wherein
the first conductive film, the first common electrode and the feed line are electrically connected to one another.

15. The display device of claim 1, further comprising:
a first scanning line disposed in the first display portion;
a second scanning line disposed in the second display portion;
a first gate driver overlapping the first light shield and electrically connected to the first scanning line;
a second gate driver overlapping the first light shield and electrically connected to the second scanning line; and
a relay portion which connects the first gate driver and the second gate driver, wherein
the relay portion is disposed in a crossing portion in which the first light shield and the second light shield cross each other.

16. The display device of claim 1, further comprising an organic insulating film disposed over the first display portion and the second display portion, wherein
the organic insulating film has a recess between the first display portion and the second display portion, and
the second sealant overlaps the recess.

17. The display device of claim 1, further comprising:
a switching element;
a first pixel electrode;
a first spacer disposed in a connection portion in which the switching element and the first pixel electrode are electrically connected to each other; and
a second spacer overlapping the second light shield and being in contact with the first spacer.

* * * * *